(No Model.)
B. D. WHITNEY.
EXPANSIBLE REAMER.
No. 577,904. Patented Mar. 2, 1897.
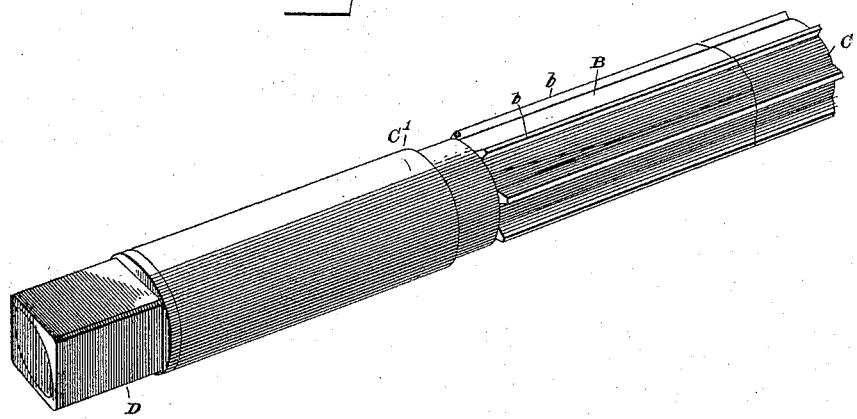
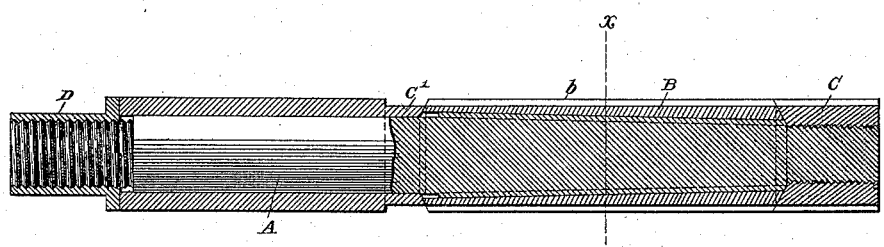
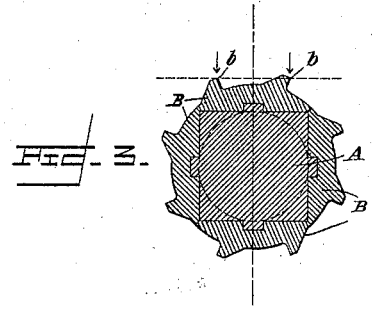
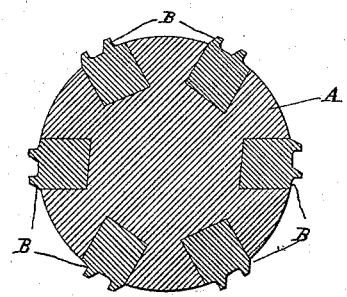
Witnesses
Edw. S. Duvall, Jr.
Wm. L. Boyden
Inventor
Baxter D. Whitney
per Fred E. Tasker,
Attorney
THE NORRIS PETERS CO., PHOTO-LITHO., WASHINGTON, D. C.

UNITED STATES PATENT OFFICE.

BAXTER D. WHITNEY, OF WINCHENDON, MASSACHUSETTS.

EXPANSIBLE REAMER.

SPECIFICATION forming part of Letters Patent No. 577,904, dated March 2, 1897.

Application filed June 17, 1893. Serial No. 477,991. (No model.)

*To all whom it may concern:*

Be it known that I, BAXTER D. WHITNEY, a citizen of the United States, residing at Winchendon, in the county of Worcester and State of Massachusetts, have invented certain new and useful Improvements in Expansible Reamers; and I do hereby declare the following to be a full, clear, and exact description of the invention, such as will enable others skilled in the art to which it appertains to make and use the same.

This invention relates to a class of tools used for truing, sizing, or slightly enlarging cylindrical holes of uniform diameter by the process technically known as "reaming."

Expansible reamers heretofore in use have usually been made with a series of blades each having a single cutting edge arranged to have a radial movement to compensate for wear of the cutting edges or for increasing its diameter for any purpose.

The form of adjustable cutters hitherto in use has been such as to restrict the number of cutting edges employed to an extent which detracts from the efficiency of the tool, especially in reamers of small diameter.

To produce a more rigid and practical form of cutter and increase the number of equally expansive cutting edges, thereby producing a more efficient tool, is the object of my invention.

It consists, essentially, of a central haft or carrier having longitudinally-oblique seats for a series of cuneiform plates or cutter-blades, with suitably-arranged cutting edges, which plates are seated upon and affixed to said carrier in a manner to be securely held and rotated thereby, being also susceptible of longitudinal movement to produce radial or expansible adjustments of the cutting edges, which is effected by movable collars or nuts adapted to engage with and act upon said plates, the ends of which they overlap in a suitable manner to keep them closely seated upon the haft and hold them firmly in position for action, as will more fully appear from the subjoined description and accompanying drawings, in which—

Figure 1 is a perspective view of a reamer complete. Fig. 2 is a central longitudinal section. Fig. 3 is a cross-section through haft and cutter-plates. Fig. 4 is a similar section representing one of the different forms of construction which may be employed in fitting the cutting-blades to the haft or carrier of large-sized reamers.

A is the body or main support of the tool, which I designate as the "haft" or "carrier." This may be made with a shank adapted to engage with a wrench, a handle, or a chuck, and of suitable length to reach through such holes as it may be intended to ream. The cutter-plates are designated by the letter B.

The faces or seats of the carrier against which the back of the cutting-blades B rest should preferably be at right angles to longitudinal planes through the axis of the carrier. Each blade should have two cutting edges $b\ b$, but no more, which cutting edges should be practically equidistant from a longitudinal plane through the axis of the carrier at right angles to a line directly intersecting the two cutting edges of the blade.

The expansible movement of the cutter-blades always corresponds to said longitudinal plane through the axis. With the cutting edges of the blades positioned and moving as above described all of the cutting edges will move the same distance from the center of the reamer on being expanded. Consequently the cutting edges will be concentric when expanded, which would not be the case were the cutting edges located and moved differently with reference to the radial plane.

To hold the blades in lateral position and guide them in their longitudinal movement, they may be tongued and grooved to their seats.

In large reamers the carrier may be cylindrical and the blades placed in longitudinal grooves in the carrier, the bottom of these grooves having sufficient longitudinal inclination to give the desired expansion of the cutters by the endwise movement of the cutter-blades which have corresponding inclination of their seats.

The plates B have beveled tenon-like ends, which engage with collars C C', which at their engaging ends have a suitable concavity to correspond therewith and to inclose or engirdle the said plates to hold them firmly to the haft as well as to regulate their longitudinal position, the position of the collars being regulated by means of screw-threads and nuts adapted thereto, as shown in Fig. 2, so that by setting the collar C (which may be internally threaded to serve as a nut as well as a collar) to a proper position the collar C' is forced firmly against the blades B by the nut D and all parts are firmly bound and held permanently in position for use until there is occasion to change the size, which may readily be readjusted by releasing nut D and making requisite change of position of collar C and again clamping the cutters by nut D.

Having thus described my invention, what I claim as new, and desire to secure by Letters Patent, is—

In a reamer, a central body or carrier, a series of plates seated upon said carrier, each plate carrying two cutting edges which are placed equidistant each side of a radial plane containing the axis, and means for adjusting each plate longitudinally upon the carrier, so as to expand the cutting edges in a direction parallel to said radial plane containing the axis of the carrier.

In testimony whereof I affix my signature in presence of two witnesses.

BAXTER D. WHITNEY.

Witnesses:
  WM. L. BOYDEN,
  EDW. S. DUVALL, Jr.